(12) United States Patent
Takeshima et al.

(10) Patent No.: US 11,682,950 B2
(45) Date of Patent: Jun. 20, 2023

(54) MANUFACTURING METHOD OF ROTOR FOR ELECTRIC MOTOR

(71) Applicant: TOYOTA JIDOSHA KABUSHIKI KAISHA, Toyota (JP)

(72) Inventors: Kenta Takeshima, Okazaki (JP); Shuzaburo Kita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/304,964

(22) Filed: Jun. 29, 2021

(65) Prior Publication Data

US 2022/0037969 A1 Feb. 3, 2022

(30) Foreign Application Priority Data

Jul. 30, 2020 (JP) .............................. JP2020-129671

(51) Int. Cl.
*H02K 15/03* (2006.01)
*H02K 1/28* (2006.01)
*H02K 1/276* (2022.01)

(52) U.S. Cl.
CPC ............. *H02K 15/03* (2013.01); *H02K 1/276* (2013.01); *H02K 1/28* (2013.01); *Y10T 29/49012* (2015.01)

(58) Field of Classification Search
CPC ...... H02K 15/03; H02K 1/2706; H02K 1/276; Y10T 29/49826; Y10T 29/49012; F05B 2220/7068; F16C 2380/26; F16C 39/063

USPC .................. 29/598, 596, 604, 607, 729, 732
See application file for complete search history.

(56) References Cited

U.S. PATENT DOCUMENTS

| 10,326,342 | B2 * | 6/2019 | Kino ..................... H02K 1/2706 |
| 2016/0049851 | A1 | 2/2016 | Hasegawa et al. |
| 2017/0040875 | A1 | 2/2017 | Kino et al. |

FOREIGN PATENT DOCUMENTS

| JP | H09163649 | * | 12/1995 |
| JP | 2006311782 | A | 11/2006 |
| JP | 2007151362 | A | 6/2007 |
| JP | 2014222964 | A | 11/2014 |
| JP | 2017038459 | A | 2/2017 |
| WO | 2014167953 | A1 | 10/2014 |

* cited by examiner

*Primary Examiner* — Thiem D Phan
(74) *Attorney, Agent, or Firm* — Hunton Andrews Kurth LLP

(57) ABSTRACT

A manufacturing method of a rotor for an electric motor is disclosed herein. The rotor may include a rotor core having a through hole that extends along an axial direction of the rotor; a magnet inserted in the through hole; and a sheet disposed between an inner surface of the through hole and the magnet. The method may include inserting the sheet into the through hole such that the sheet extends through the through hole; and inserting the magnet into the through hole while the sheet is pulled at axial ends of the sheet in opposite directions to apply tension to the sheet and press the sheet against the inner surface.

9 Claims, 10 Drawing Sheets

//MANUFACTURING METHOD OF ROTOR FOR ELECTRIC MOTOR

CROSS-REFERENCE TO RELATED APPLICATION

This application claims priority to Japanese Patent Application No. 2020-129671 filed on Jul. 30, 2020, the contents of which are hereby incorporated by reference into the present application.

TECHNICAL FIELD

The technique disclosed herein relates to a manufacturing method of a rotor for an electric motor. In particular, it relates to a manufacturing method of a rotor that comprises a rotor core having a through hole extending axially and a magnet inserted in the through hole.

BACKGROUND

Japanese Patent Application Publication No. 2014-222964 describes a manufacturing method of a rotor for an electric motor that includes inserting a magnet into a through hole of a rotor core. A string or a band is disposed between the magnet and an inner surface of the through hole. In the manufacturing method of Japanese Patent Application Publication No. 2014-222964, the string or the band is pushed by the magnet into the through hole.

SUMMARY

A sheet may be used, instead of a string or a band, to fix a magnet in a through hole. Pushing the sheet by the magnet into the through hole of a rotor core could tear the sheet. The disclosure herein provides a manufacturing method that can mitigate damage to a sheet when a magnet is inserted into a through hole.

The disclosure herein discloses a manufacturing method of a rotor for an electric motor. The rotor may comprise a rotor core having a through hole that extends along an axial direction of the rotor; a magnet inserted in the through hole; and a sheet disposed between an inner surface of the through hole and the magnet. The method may comprise inserting the sheet into the through hole such that the sheet extends through the through hole; and inserting the magnet into the through hole while the sheet is pulled at axial ends of the sheet in opposite directions to apply tension to the sheet and press the sheet against the inner surface.

In the above manufacturing method, the sheet is inserted through the through hole before the magnet is inserted. The magnet is inserted through while tension is applied to the sheet and the sheet is pressed against the inner surface. The sheet is stretched in an axial direction of the rotor core by the application of tension, which makes a surface of the sheet smooth. The magnet slides smoothly on the surface of the sheet to be inserted through the through hole. The manufacturing method of the rotor disclosed herein mitigates damage to the sheet when the magnet is inserted. Even with a narrow space between the inner surface of the through hole and the magnet, the sheet is less likely to be torn upon the insertion of the magnet. The manufacturing method of the rotor disclosed herein is suitable for a rotor in which a space between art inner surf ace of its through hole and a magnet is narrow.

Details and further improvements of tire technique disclosed herein will be described in Detailed Description below.

DETAILED DESCRIPTION

Figure 1:
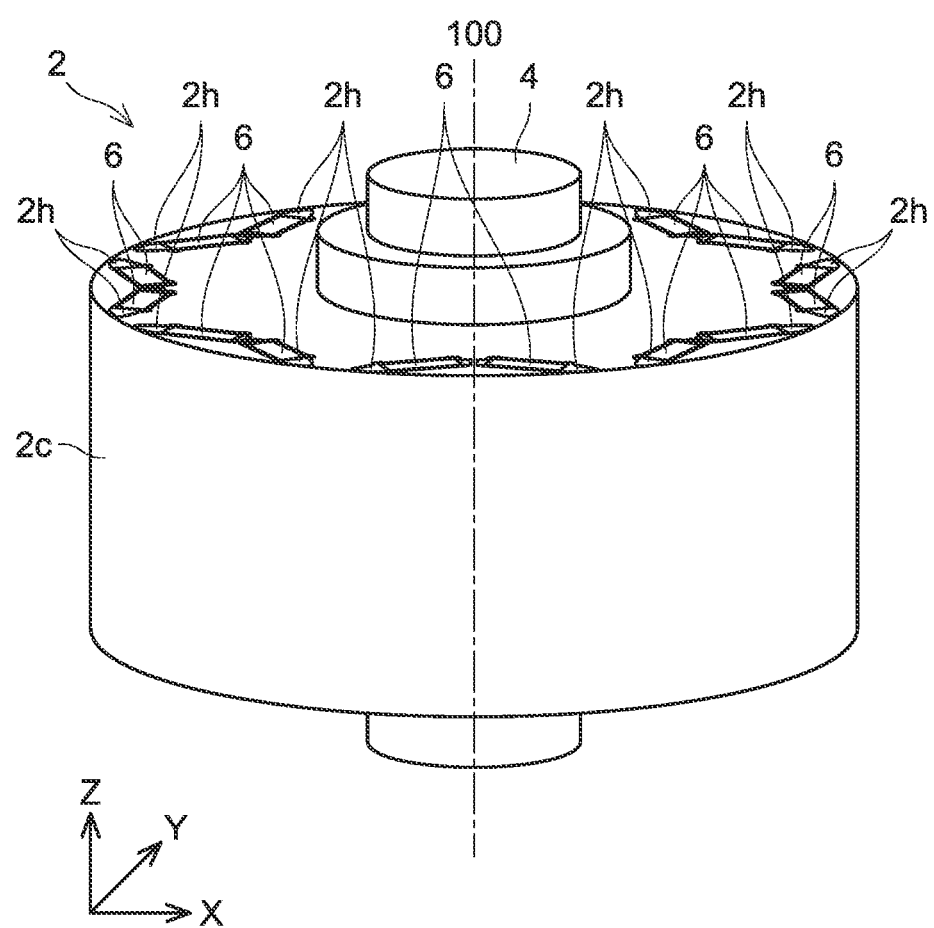
FIG. 1 is a perspective view of a rotor manufactured by a manufacturing method according to an embodiment.

Referring to the drawings, a manufacturing method of a rotor for an electric motor (which may be simply termed "the manufacturing method" hereinbelow) according to an embodiment will be described. Referring to FIG. 1, a rotor 2 that is manufactured by the manufacturing method according to the embodiment will be described. A Z-axis shown in the drawings is parallel to an axis 100 of the rotor 2. An XY plane is perpendicular to the Z-axis. In the disclosure herein, a direction parallel to the Z-axis may be simply termed "an axal direction". Further, a direction of a line that is parallel to the XY plane and passes the intersection point, of the axis 100 with the XY plane may be simply termed "a radial direction".

The rotor 2 constitutes an electric motor (not shown). A stator is disposed radially outward of the rotor 2, although this is not shown. When a current flows in coils of the stator, a magnetic force is generated between the rotor 2 and the stator, and the rotor 2 thereby rotates around the axis 100. The rotor 2 constitutes a radial gap electric motor.

As shown in FIG. 1, the rotor 2 includes a rotor core 2c, a shaft 4, and magnets 6. The rotor core 2c is configured of a plurality of steel plates stacked in the axial direction. The steel plates configuring the rotor core 2c are insulated from each other. Since the rotor core 2c is configured of the stack of insulated steel plates, the occurrence of an overcurrent in the rotor core 2c can be reduced. Further, an iron loss in the rotor 2 can be thereby reduced.

The rotor core 2c includes a plurality of through holes 2h. Holes are defined in advance in each of the steel plates constituting the rotor core 2c, and the holes of the stacked steel plates are overlapped over each other, and thereby the through holes 2h are configured. Each of the magnets 6 is inserted in corresponding one of the through holes 2h. The shaft 4 has a cylindrical shape extending in the axial direction. The shaft 4 penetrates a center portion of the rotor core 2c in the axial direction.

Figure 2:
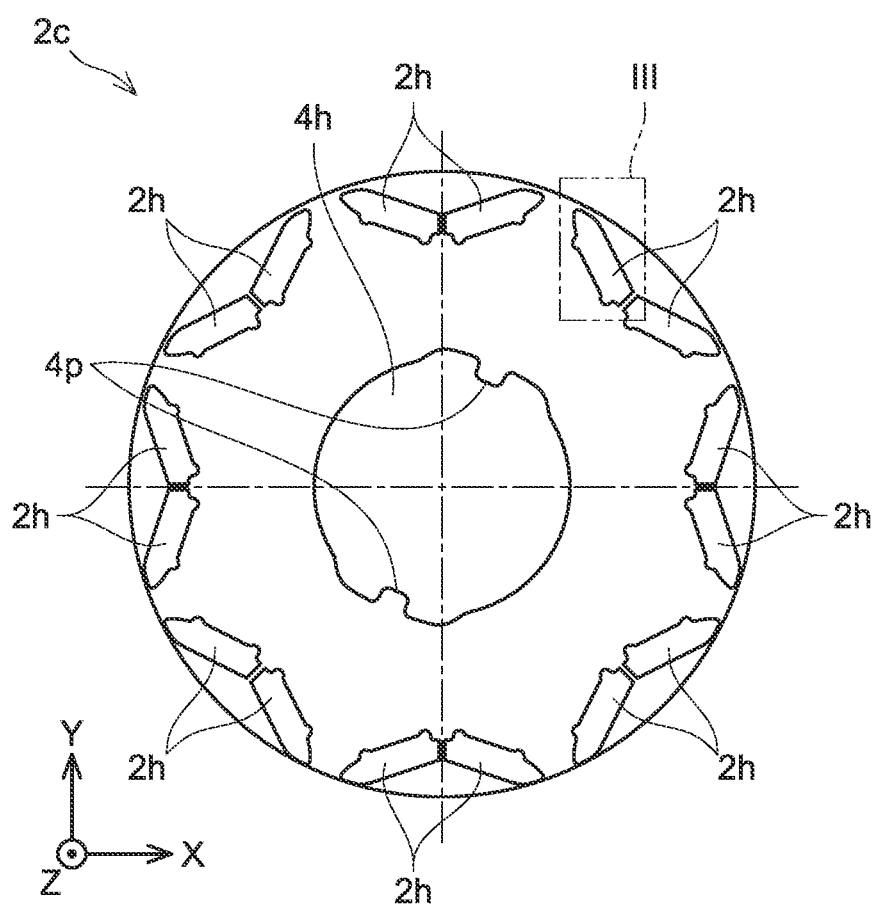
FIG. 2 is a plan view of a rotor core.

As shown in FIG. 2, the rotor core 2c has sixteen through holes 2h. The through holes 2h penetrate the rotor core 2c in the axial direction. The sixteen through holes 2h are divided into and arranged in eight pairs. Each pair of the through holes 2h corresponds to one pole of the rotor 2 (see FIG. 1).

That is, the rotor core 2c has the through holes 2h corresponding to eight poles in total. The through holes 2h in each pair are arranged symmetrically to each other. The pairs of the through holes 2h are arranged along an outer circumference of the rotor core 2c such that they face the center of the rotor core 2c. The number of the through holes 2h included in the rotor core 2c can be adjusted according to the number of poles of the rotor 2.

A shaft hole 4h is defined in the center portion of the rotor core 2c. lire shaft hole 4h penetrates the rotor core 2c in the axial direction. Two protrusions 4p are disposed on an inner surface of the shaft hole 4h. One of the protrusions 4p is positioned to face the other protrusion 4p. Grooves are defined on both sides of each protrusion 4p, respectively. The shaft 4 (see FIG. 1) is fixed to the rotor core 2c by engaging with the protrusions 4p and the grooves of the shaft hole 4h.

Figure 3:
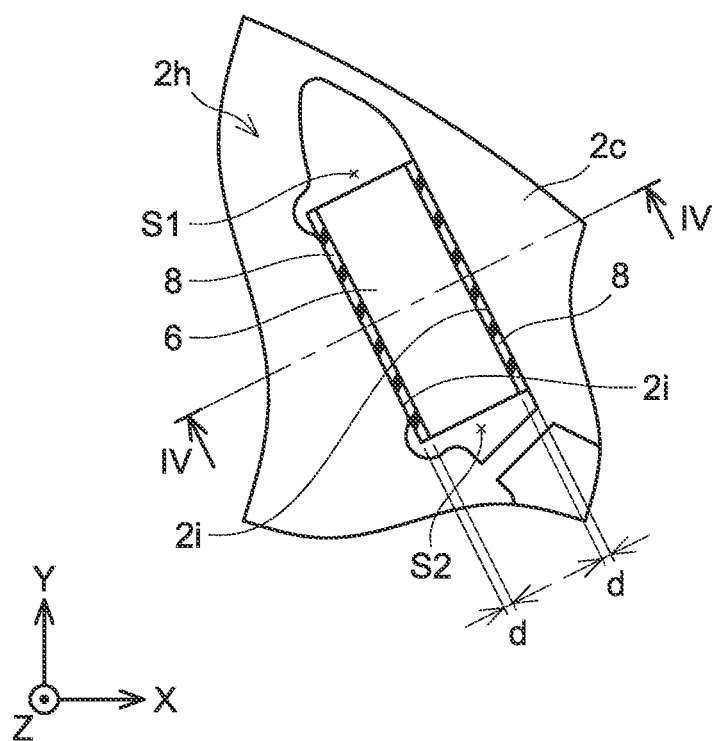
FIG. 3 is an enlarged view of a region enclosed with a broken line III in FIG. 2.

Referring to FIG. 3, the shape of the through holes 2h will be described in detail. FIG. 3 shows an enlarged view of a region enclosed with a dashed line III in FIG. 2, that is, an enlarged view of one through hole 2h and its surroundings. The other through holes 2h have the same shape. The through hole 2h has a substantially rectangular shape. The width of the through hole 2h is gradually narrowed at one of longitudinal ends (which is an upper end in FIG. 3) of the through hole 2h. A fiat surface extending toward the center of the rotor core 2c (i.e., the axis 100) is disposed at the other longitudinal end (which is a lower end in FIG. 3) of the through hole 2h. The shape of the through hole 2h is the combination of a substantially rectangular shape and multiple shapes. The through hole 2h includes inner surfaces 2i facing each other in a width direction of the through hole 2h. One of the inner surfaces 2i extends substantially in parallel to the other inner surface 2i. That is, a distance between the one inner surface 2i and the other inner surface 2i is constant.

As shown in FIG. 3, the rectangular-shaped magnet 6 is inserted in the through hole 2b of the rotor core 2c in a direction of the axis 100 (i.e., the axial direction). As described, the rotor core 2c is configured of the stack of steel plates. A magnetic flux is generated in the rotor core 2c by the magnet 6 being inserted into the rotor core 2c of the stack of steel plates. Generating a strong magnetic flux in the rotor core 2c requires distances d between the magnet 6 and inner surfaces 2i of the rotor core 2c (the inner surfaces 2i of the through hole 2b) to be small Sheets 8 are disposed between each inner surface 2i of the rotor core 2c and the magnet 6. The sheets 8 are constituted of thermoplastic resin that is expandable by application of heat. Although details will be described later referring to FIG. 9, the magnet 6 is fixed in the through hole 2h by each sheet 8 being expanded and pressing the magnet 6 against the opposite inner surface 2i. The resin sheets 8 also function as insulators that prevent electrical conduction between the magnet 6 and the inner surfaces 2i of the rotor core 2c. As shown in FIG. 3, the sheets 8 are disposed between ends of the magnet 6 in its width direction and the inner surfaces 21 of the rotor core 2c. The magnet 6 is not in direct contact with the inner surfaces 2i. If the magnet 6 directly contacted at least one of the inner surfaces 2i and electrical conduction occurred therebetween, an iron loss would occur in the rotor 2 (see FIG. 1). The iron loss can be reduced in the rotor 2 since the sheets 8 constituted of insulating material are disposed between the magnet 6 and the inner surfaces 2i.

There is a space S1 between one of longitudinal ends of the magnet 6 and corresponding one of longitudinal ends of the through bole 2h, and there is a space S2 between the other longitudinal end of the magnet 6 and the other longitudinal end of the through hole 2h. The spaces S1 and S2 penetrate tire rotor core 2c in the axial direction. When the rotor 2 (see FIG. 1) incorporated in the electric motor (not shown) rotates, the magnet 6 generates heat. The longitudinal ends of the magnet 6 are exposed to the spaces S1 and S2. Oil for cooling the magnet 6 circulates through the spaces S1 and S2 while the rotor 2 rotates, and thereby the longitudinal ends of heated magnet 6 can be directly cooled.

Figure 4:
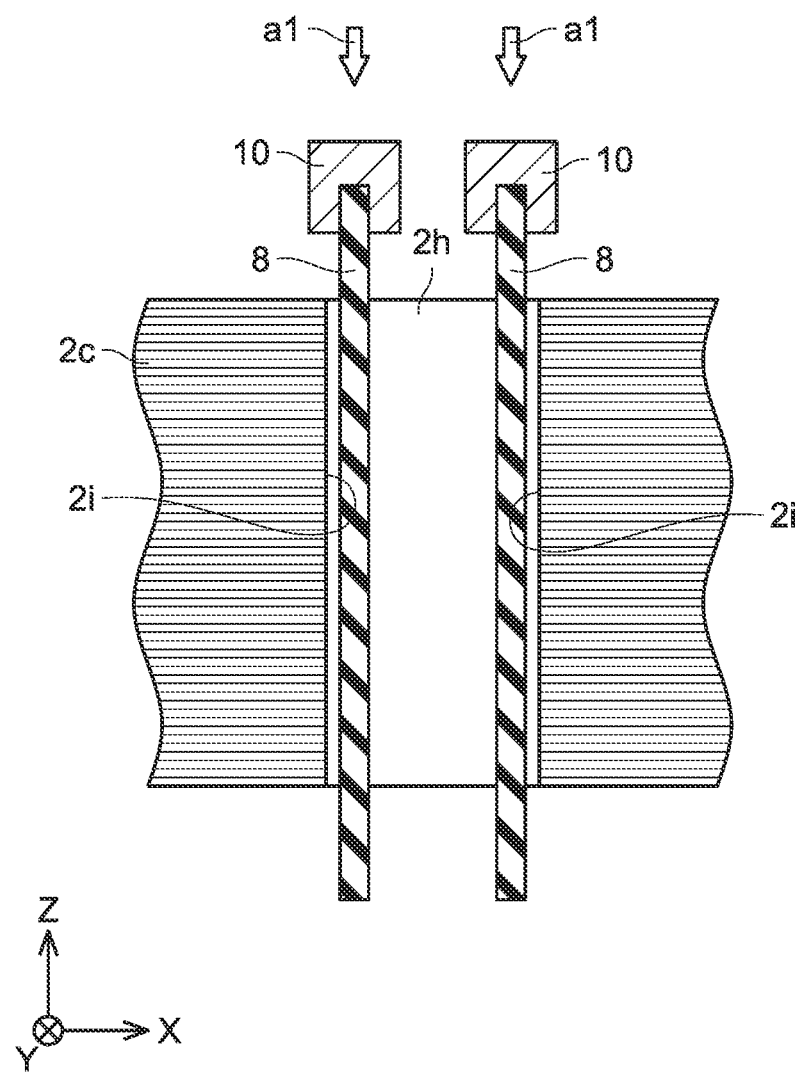
FIG. 4 is a cross sectional view in a sheet insertion step.

Hereinafter, a sheet insertion step, a magnet insertion step, a fixation step, and a cutting step of the manufacturing method according to the embodiment will be described. The sheet insertion step will be described referring to FIG. 4. FIG. 4 shows a cross section along a line IV-IV in FIG. 3. In the manufacturing method according to the embodiment, two sheets 8 are inserted into each of the through holes 2h such that they extend therethrough, as shown in FIG. 4. In the following description, a direction of positive Z-axis in the coordinate system shown in the drawings may be termed "upper/upward" and the opposite direction may be termed "lower/downward".

In the sheet insertion step, the sheets 8 are firstly positioned above the through hole 2h with upper ends of the sheets 8 clamped with first clamps 10 respectively. Then, the first clamps 10 move in a direction of arrows a1 shown in FIG. 4 (i.e., downward). Thereby, the sheets 8 are inserted into the through hole 2h of the rotor core 2c. The first clamps 10 keep moving in the direction of the arrows a1 until lower ends of the sheets 8 exit the through hole 2h of the rotor core 2c.

Figure 5:
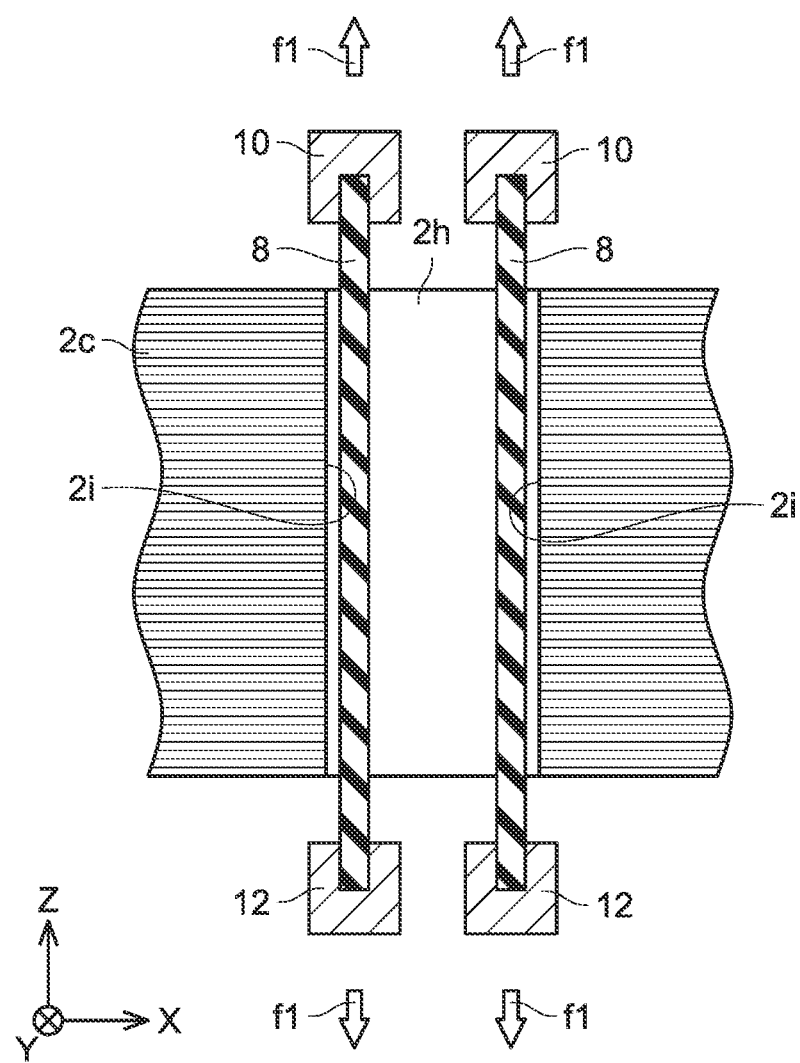
FIG. 5 is a cross sectional view showing that the sheet is being pulled at its both ends in a magnet insertion step.

The magnet insertion step is started after the sheets 8 have been inserted through the through hole 2h in the sheet insertion step. In the magnet insertion step, firstly, the lower ends of the sheets 8, which have exited the through hole 2h, are clamped with second clamps 12 respectively, as shown in FIG. 5. Then, the first clamps 10 pull the sheets 8 upward with a force f1. Similarly, the second clamps 12 pull the sheets 8 downward with the force f1. That is, each sheet 8 is pulled at its axial ends in opposite directions. U should be noted that the magnitude of the force f1 is not so large that it does not cause breakage of the sheets 8. Each of the first clamps 10 includes a load sensor that measures tension applied to the sheet 8. although this is not shown. The first clamps 10 control the force f1 using the load sensors. Tension is applied upwardly and downwardly (i.e., in the opposite directions) to the sheets 8. The sheets 8 are stretched upwardly and downwardly by the upward and downward application of tension to the sheets 8. Thereby, wrinkles on surfaces of the sheets 8 are removed, which makes the surfaces of the sheets 8 smooth.

Figure 6:
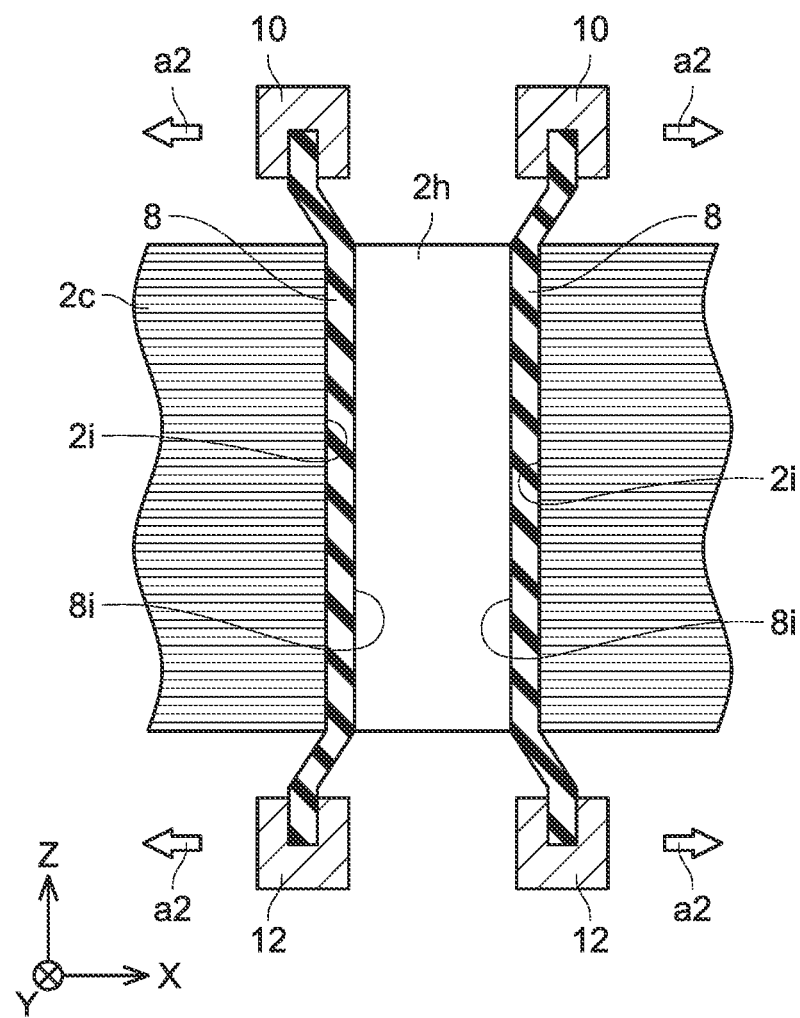
FIG. 6 is a cross sectional view showing that the sheet is being pressed against an inner surface in tire magnet insertion step.

Next, in the magnet insertion step, the first clamps 10 move away from each other (move in directions of arrows a2) along the XY plane while the upward and downward tension is applied to the sheets 8, as shown in FIG. 6. The second clamps 12 also move away from each other along the XY plane. As a result, each of the sheets 8 is pressed against corresponding one of the inner surfaces 2i of the through hole 2h. When the sheets 8 are pressed against the inner surfaces 2i by the first clamps 10 and the second clamps 12 pulling the sheets 8 in the directions of the arrows a2, tension is applied upwardly and downwardly to portions of the sheet 8 that contact the inner surfaces 2i. The sheets 8 are pressed against the inner surfaces 2i with surfaces 8i of the sheets 8 smoothed.

Figure 7:
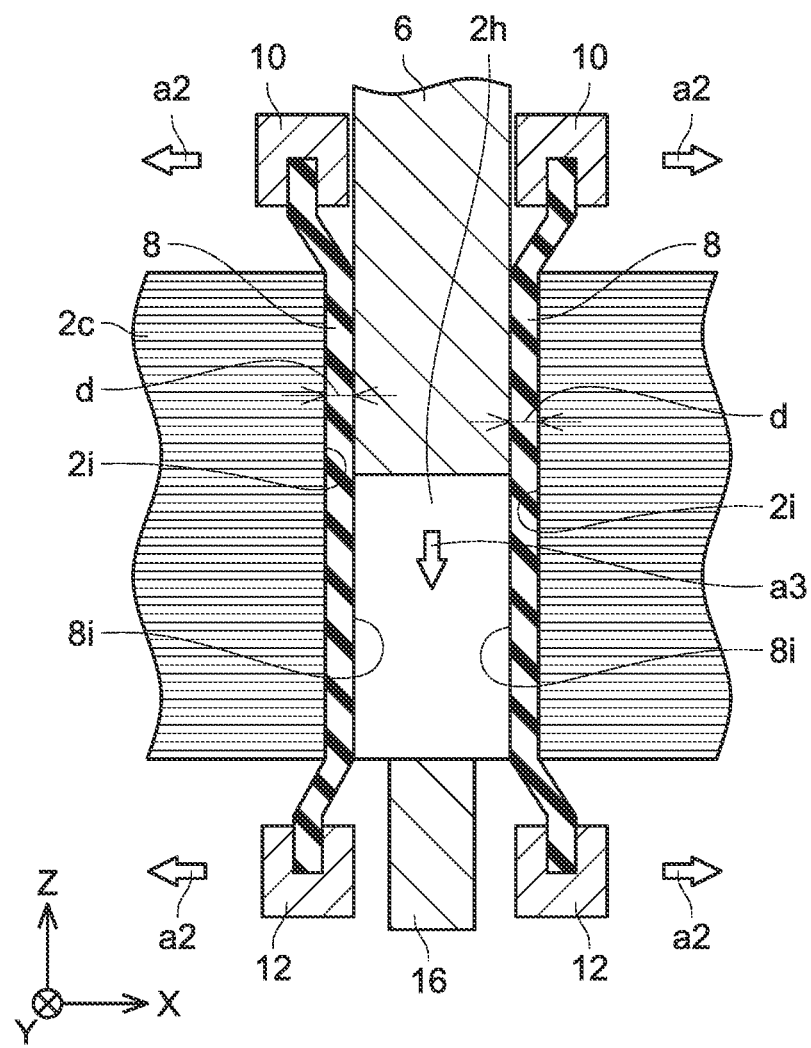
FIG. 7 is a cross sectional view showing that the magnet is inserted into a through hole in the magnet insertion step.

In the magnet insertion step, as shown in FIG. 7, the magnet 6 is inserted from above into the through hole 2h in a direction of an arrow a3 while the upward and downward tension is applied to the sheets 8 and the sheets 8 are pressed against the inner surfaces 2i of the through hole 2h. Thus, a lower end of the magnet 6 is less likely to be caught by the surfaces 8i of the sheets 8 when the magnet 6 is inserted. That is, the sheets 8 are less likely to be damaged when the magnet 6 is inserted Further, in the magnet insertion step, a distance between the surfaces 8i of the two sheets 8 is increased by the sheets 8 being pressed against the inner surfaces 2i. In addition, the thicknesses of the sheets 8 become smaller than usual due to their elastic deformation caused by the upward and downward tension, and (hereby the distance between the surfaces 81 of the two sheets 8 is increased further. Thus, the lower end of the magnet 6 is less likely to interfere with the surfaces 8i of the sheets 8 when the magnet 6 is inserted. That is, the sheets 8 are less likely to be torn when the magnet 6 is inserted. If the sheet(s) 8 were torn, the tension on the sheet(s) 8 wall decrease sharply, in the magnet insertion step, the aforementioned load sensors measure changes in the tension applied by the first clamps 10 and the second damps 12 to the sheets 8. and thus it is possible to detect a tear in the sheet(s) 8.

Since the sheets 8 axe less likely to be tom when the magnet 6 is inserted, side surfaces of the magnet 6 are allowed to be closer to the inner surfaces 2i of the through hole 2h according to the manufacturing method disclosed herein. In other words, the length of the magnet 6 in its width direction (i.e., in the X-axis direction) can be increased As a result, a distance d between each side surface of the magnet 6 and the corresponding inner surface 2i can be shortened. That is, according to the manufacturing method disclosed herein, a strong magnetic flux can be generated by the rotor core 2c (see FIG. 1) in which the magnets 6 are inserted.

Figure 8:
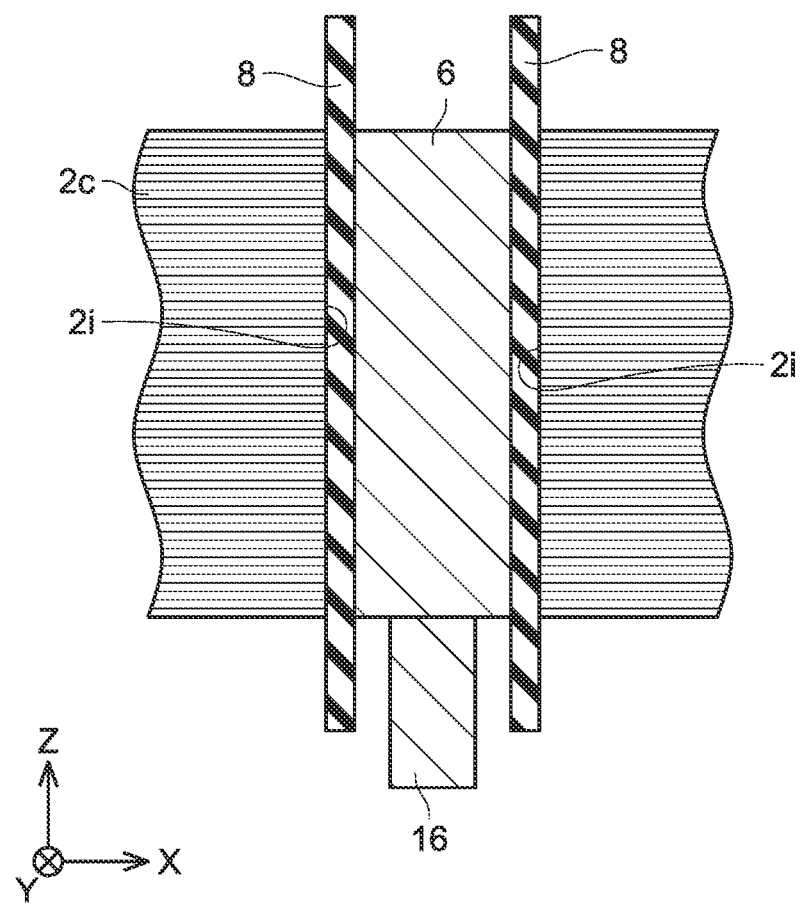
FIG. 8 is a cross sectional view in a fixation step.

In the magnet insertion step, the insertion of the magnet 6 into the through hole 2h continues until a lower surface of the magnet 6 contacts an upper surface of a supporting jig 16. After this, the first clamps 10 and the second clamps 12 separate from the sheets 8. Thereby, the upward and downward tension applied to the sheets 8 is released. As a result, the elastic deformation of the sheets 8 is eliminated and the sheets 8 are restored to their original shapes. When the elastic deformation of the sheets 8 is eliminated, the thicknesses of the sheets 8 are increased. Thereby, the sheets 8 are held between the magnet 6 and the inner surfaces 2i, as shown in FIG. 8.

When the first clamps 10 and the second clamps 12 separate from the sheets 8, the fixation step starts. In the fixation step, the rotor core 2c, the magnet 6, and the sheets 8 are heated with the magnet 6 supported by the supporting jig 16 as shown in FIG. 8. As described, the sheets 8 are constituted of the expandable material The sheets 8 expand by the heating. As a result, the sheets 8 increase their thicknesses and press the magnet 6 toward their opposite inner surfaces 2i. Thereby, the magnet 6 is fixed in the through hole 2h Expanding the sheets 8 constituted of the expandable material to fix the magnet 6 in the fixation step as described above facilitates the fixation of the magnet 6, as compared to a step in which gaps between the magnet 6 and the inner surfaces 2i are filled with molten resin.

Figure 9:
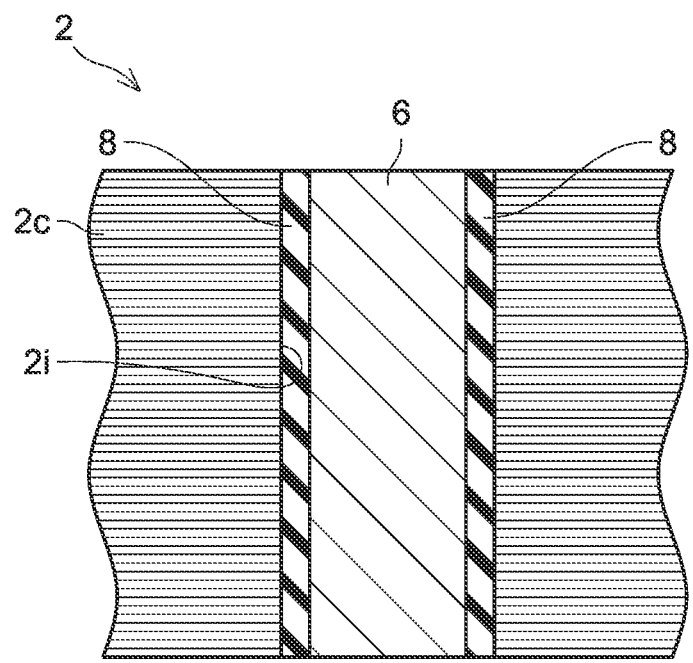
FIG. 9 is a cross sectional view in a cutting step.
Figure 9:
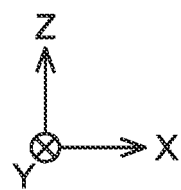

After the magnet 6 has been fixed in the through hole 2h by the expansion of the sheets 8, the supporting jig 16 is removed. Then, the cutting step is started. In the cutting step, the ends of the sheets 8 are cut off along upper and lower surfaces of the rotor core 2c as shown in FIG. 9. Lastly, the shaft 4 (see FIG. 1) is inserted through the rotor core 2c, and thereby the rotor 2 is completed.

Figure 10:
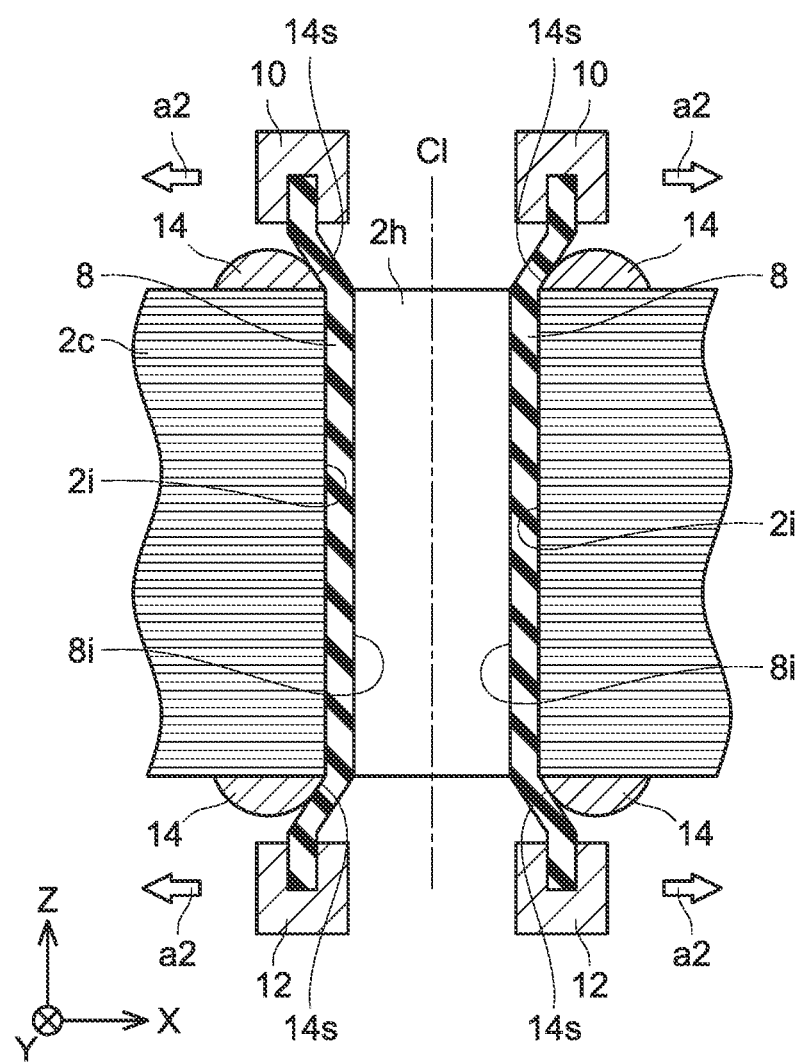
FIG. 10 is a cross sectional view in a magnet insertion step according to another embodiment.

Referring to FIG. 10, a manufacturing method according to another embodiment will be described. In the manufacturing method according to the other embodiment, two guides 14 are disposed on each of the upper and lower surfaces of the rotor core 2c before the sheet insertion step described referring to FIG. 4. That is, the two guides 14 are disposed on each of both ends of the rotor core 2c. It should be noted that in FIG. 10, the guides 14 are disposed at all ends of the inner surfaces 2i of the through hole 2h. however, at least one guide 14 may be disposed at at least one end of selected inner surface 2i.

Each guide 14 includes a guide surface 14s on its surface. An end of each guide surface 14s that is closer to a center line C1 of the through hole 2h aligns with its corresponding inner surface 2i of the through hole 2h of the rotor core 2c with respect to a right-left direction in FIG. 10. That is, the end of each guide surface 14s is in contact with the end of the corresponding inner surface 2i. The guide surfaces 14s cover upper ends of the inner surfaces 2i from above and lower ends of the inner surfaces 2i from below. Burrs extending in an up-down direction may be left at upper and lower ends of the inner surfaces 2i of the through hole 2h. As described referring to FIG. 6. the sheets 8 are pressed against the inner surfaces 2i by the first clamps 10 and the second clamps 12 in the magnet insertion step. With the burrs left at the upper and lower ends of the inner surfaces 2i. the sheets 8 would be pressed against the burrs, and thereby the sheets 8 may be torn. As shown in FIG. 10, in the manufacturing method according to the present embodiment, the guides 14 cover the upper and lower ends of the inner surfaces 2i. Thus, the sheets 8 are less likely to contact the burrs in the magnet insertion step. As a result, the sheets 8 are less likely to be tom in the magnet insertion step.

The guide surfaces 14s are curved so as to gradually be distanced away from the center line C1 of the through hole 2h as distances from the upper and lower surfaces of the rotor core 2c increase. That is, there are no acute-angled edges on the guide surfaces 14s. The sheets 8 are not pressed against edges of the guides 14 in the magnet insertion step since the guide surfaces 14s are curved. Thus, the sheets 8 are less likely to be tom in the magnet insertion step.

While specific examples of the present disclosure have been described above in detail, these examples are merely illustrative and place no limitation on the scope of the patent claims. The technology described in the patent claims also encompasses various changes and modifications to the specific examples described above. Hereinafter, variants of the above-described embodiments will be described.

In the manufacturing methods described above, each magnet 6 is fixed in the corresponding through hole 2h using two sheets 8. instead of this, in a first variant, each magnet 6 may be fixed in the corresponding through hole 2h using one sheet 8.

The sheets 8 used in the above-described manufacturing methods are constituted of the expandable material. Instead of this, in a second variant, sheets that bond the magnets 6 to the inner surfaces 2i of the through holes 2h by the application of heat may be used.

In the above-described manufacturing methods, the sheets 8 are pressed against the inner surfaces 2i by moving the first clamps 10 and the second clamps 12. Instead of this, in a third variant, the sheets 8 may be pressed against the inner surfaces 2i, for example, by creating a vacuum state in spaces between the sheets 8 and the inner surfaces 2i.

In a fourth variant, the sheets 8 may be pressed against the inner surfaces 2i by static electricity generated by charging the sheets 8.

In above-described the manufacturing methods, the ends of the sheets 8 are cut off in the cutting step, however, in a fifth variant, the ends of the sheets 8 may not be cut off.

In the above-described manufacturing methods, the rotor 2 uses the rotor core 2c configured of the stack of steel plates. Instead of this, in a sixth variant, an integrally configured rotor core may be used.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A manufacturing method of a rotor for an electric motor, wherein
    the rotor comprises:
        a rotor core having a first end surface, a second end surface and a through hole that extends from the first end surface to the second end surface along an axial direction of the rotor;
        a magnet inserted in the through hole; and
        a first sheet disposed between a first inner surface of the through hole and the magnet, and
        a second sheet disposed between a second inner surface of the through hole and the magnet, wherein the second inner surface faces the first inner surface in a radial direction perpendicular to the axial direction,
    the method comprises:
        inserting the first sheet and the second sheet into the through hole such that the first and second sheets extends through the through hole;
        disposing a first guide having a first guide surface, a second guide having a second guide surface, a third guide having a third guide surface and a fourth guide having a fourth guide surface such that:
            the first guide is disposed on the first end surface of the rotor and the first guide surface is in contact with an end of the first inner surface;
            the second guide is disposed on the second end surface of the rotor and the second guide surface is in contact with another end of the first inner surface;
            the third guide is disposed on the first end surface of the rotor and the third guide surface is in contact with an end of the second inner surface; and
            the fourth guide is disposed on the second end surface of the rotor and the fourth guide surface is in contact with another end of the second inner surface;
        clamping the first sheet and the second sheet by a first clamp, a second clamp, a third clamp and a fourth clamp such that:
            the first clamp clamps an end of the first sheet extending out from the through hole at the first end surface of the rotor;
            the second clamp clamps another end of the first sheet extending out from the through hole at the second end surface of the rotor;
            the third clamp clamps an end of the second sheet extending out from the through hole at the first end surface of the rotor; and
            the fourth clamp clamps another end of the second sheet extending out from the through hole at the second end surface;
        moving the first clamp, the second clamp, the third clamp and the fourth clamp such that:
            the first clamp and the second clamp move away from each other along the axial direction so as to apply tension to the first sheet;
            the third clamp and the fourth clamp move away from each other along the axial direction so as to apply tension to the second sheet;
            the first clamp moves away from the third clamp in the radial direction and the second clamp moves away from the fourth clamp in the radial direction so as to press the first sheet against the first inner surface of the through hole, the first guide surface of the first guide and the second guide surface of the second guide; and
            the third clamp moves away from the first clamp in an opposite direction to the radial direction and the fourth clamp moves away from the second clamp in the opposite direction to the radial direction so as to press the second sheet against the second inner surface of the through hole, the third guide surface of the third guide and the fourth guide surface of the fourth guide; and
        inserting the magnet into the through hole after the moving of the first clamp, the second clamp, the third clamp and the fourth clamp.

2. The manufacturing method according to claim 1, wherein
    the first guide surface is curved so as to gradually be distanced away from a center line of the through hole as a distance from the rotor core increases.

3. The manufacturing method according to claim 1, wherein
    the first sheet is constituted of an expandable material, and
    the manufacturing method further comprises fixing the magnet in the through hole by expanding the first sheet after the inserting of the magnet into the through hole.

4. The manufacturing method according to claim 1, further comprising cutting the ends of the first sheet after the inserting of the magnet into the through hole.

5. The manufacturing method according to claim 1, wherein the rotor core is configured of a stack of a plurality of steel plates.

6. The manufacturing method according to claim 1, wherein
    the first guide surface, the second guide surface, the third guide surface, the fourth guide surface are curved so as to gradually be distanced away from a center line of the through hole as a distance from the rotor core increases.

7. The manufacturing method according to claim 1, wherein
    the first sheet and the second sheet are constituted of an expandable material, and
    the manufacturing method further comprises fixing the magnet in the through hole by expanding the first sheet and the second sheet after the inserting of the magnet into the through hole.

8. The manufacturing method according to claim 1, further comprising cutting the ends of the first sheet and the ends of the second sheet after the inserting of the magnet into the through hole.

9. The manufacturing method according to claim 1, wherein the disposing of the first guide, the second guide, the third guide and the fourth guide are performed before the inserting of the first sheet and the second sheet into the through hole.

* * * * *